United States Patent
Zhou et al.

(10) Patent No.: US 11,769,317 B2
(45) Date of Patent: Sep. 26, 2023

(54) FULLY AUTOMATED SEM SAMPLING SYSTEM FOR E-BEAM IMAGE ENHANCEMENT

(71) Applicant: ASML Netherlands B.V., Veldhoven (NL)

(72) Inventors: Wentian Zhou, San Jose, CA (US); Liangjiang Yu, San Jose, CA (US); Teng Wang, San Jose, CA (US); Lingling Pu, San Jose, CA (US); Wei Fang, Milpitas, CA (US)

(73) Assignee: ASML Netherlands B.V., Veldhoven (NL)

( * ) Notice: Subject to any disclaimer, the term of this patent is extended or adjusted under 35 U.S.C. 154(b) by 100 days.

(21) Appl. No.: 16/718,706

(22) Filed: Dec. 18, 2019

(65) Prior Publication Data
US 2020/0211178 A1  Jul. 2, 2020

Related U.S. Application Data

(60) Provisional application No. 62/787,031, filed on Dec. 31, 2018.

(51) Int. Cl.
*G06T 7/00* (2017.01)
*G06V 10/774* (2022.01)
(Continued)

(52) U.S. Cl.
CPC .......... *G06V 10/774* (2022.01); *G06F 18/214* (2023.01); *G06T 7/0006* (2013.01);
(Continued)

(58) Field of Classification Search
CPC ......... G06T 7/0006; G06T 2207/10061; G06T 2207/20081; G06T 2207/30148; G06K 9/6256; G06K 9/6262; G06K 9/036
See application file for complete search history.

(56) References Cited

U.S. PATENT DOCUMENTS

2014/0301630 A1* 10/2014 Kulkarni ............... G06T 7/0004
                                                                382/149
2017/0193680 A1*  7/2017 Zhang ................ G01N 21/9501
(Continued)

FOREIGN PATENT DOCUMENTS

JP    2003059441 A    2/2003
JP    2005315596 A   11/2005
(Continued)

OTHER PUBLICATIONS

Office Action of the Intellectual Property Office of Taiwan issued in related Taiwanese Patent Application No. 108147527; dated Nov. 13, 2020 (20 pgs.).

(Continued)

*Primary Examiner* — Ping Y Hsieh
(74) *Attorney, Agent, or Firm* — Finnegan, Henderson, Farabow, Garrett & Dunner, LLP

(57) ABSTRACT

Disclosed herein is a method of automatically obtaining training images to train a machine learning model that improves image quality. The method may comprise analyzing a plurality of patterns of data relating to a layout of a product to identify a plurality of training locations on a sample of the product to use in relation to training the machine learning model. The method may comprise obtaining a first image having a first quality for each of the plurality of training locations, and obtaining a second image having a second quality for each of the plurality of training locations, the second quality being higher than the first quality. The method may comprise using the first image and the second image to train the machine learning model.

16 Claims, 9 Drawing Sheets

(51) Int. Cl.
  *G06F 18/214* (2023.01)
  *G06V 10/776* (2022.01)
  *G06V 10/98* (2022.01)

(52) U.S. Cl.
  CPC .......... *G06V 10/776* (2022.01); *G06V 10/993* (2022.01); *G06T 2207/10061* (2013.01); *G06T 2207/20081* (2013.01); *G06T 2207/30148* (2013.01)

(56) References Cited

U.S. PATENT DOCUMENTS

| | | | |
|---|---|---|---|
| 2018/0293721 A1 | 10/2018 | Gupta et al. | |
| 2018/0342045 A1 | 11/2018 | Lutz et al. | |
| 2019/0377814 A1* | 12/2019 | Shtrom | G01S 7/412 |

FOREIGN PATENT DOCUMENTS

| | | |
|---|---|---|
| JP | 2009224848 A | 10/2009 |
| JP | 2011170456 A | 9/2011 |
| JP | 2017050222 A | 3/2017 |
| JP | 2017143034 A | 8/2017 |
| JP | 2018137275 A | 8/2018 |
| TW | 201734895 A | 10/2017 |
| TW | 201734955 A | 10/2017 |
| TW | 201842457 A | 12/2018 |
| WO | WO 2008/133951 A2 | 11/2008 |

OTHER PUBLICATIONS

Chao Dong et al. "Learning a Deep Convolutional Network for Image Super-Resolution" In "RoboCup 2018: Robot Soccer World Cup XII", Jan. 1, 2014, Springer International Publishing, Cam 032682, XP055545078, ISBN: 978-3-319-10403-4 vol. 8692, (16 pages).
International search report in related International Application No. PCT/EP2019/085720, dated Mar. 20, 2020 (3 pages).
Notice of Reasons for Rejection from the Japan Patent Office issued in related Japanese Patent Application No. 2021-533481; dated Jul. 4, 2022 (15 pgs.).
Notification of Reasons(s) for Refusal issued by Korean Patent Office in related Korean Patent Application No. 10-2021-7019393; dated Jun. 20, 2023 (10 pgs).

* cited by examiner

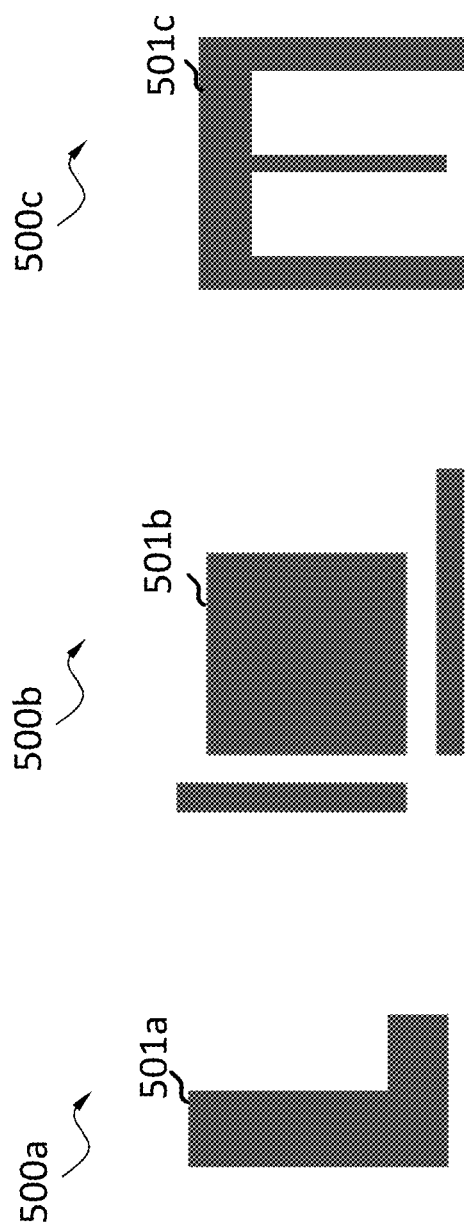

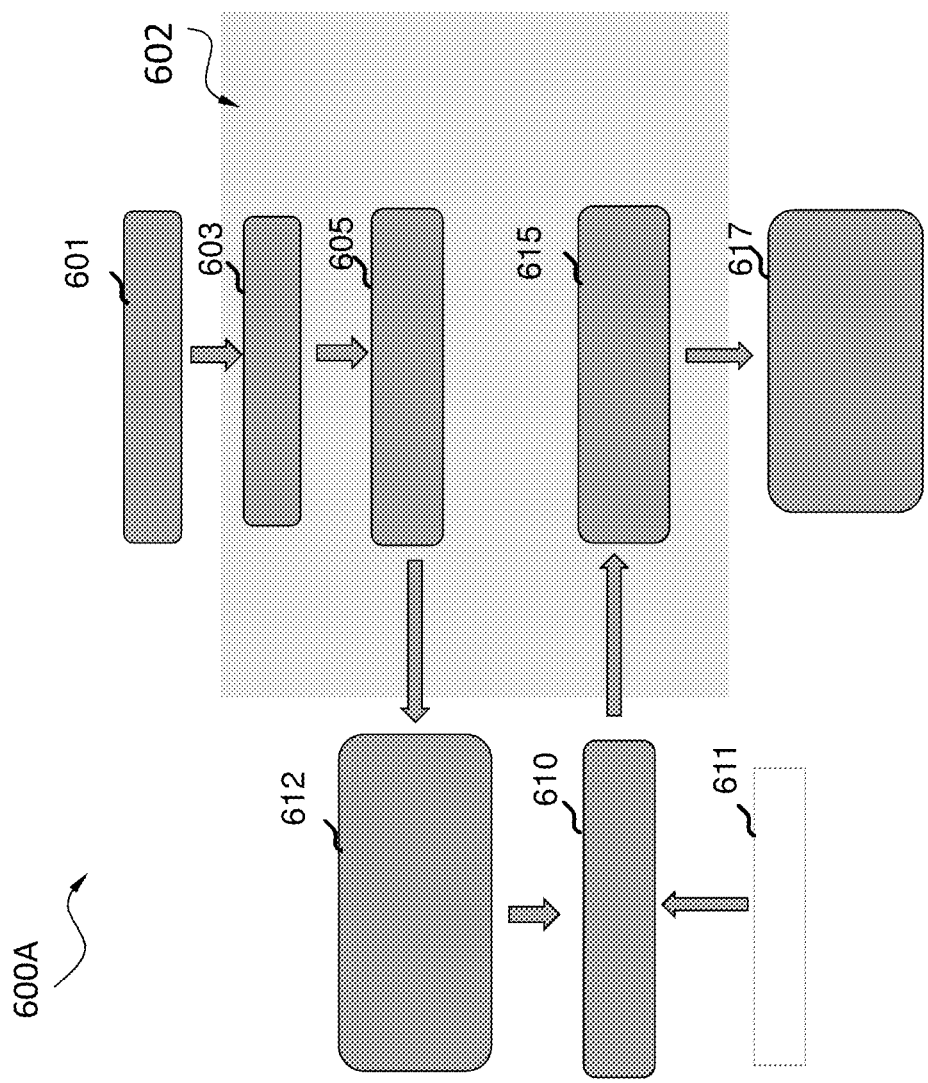

FULLY AUTOMATED SEM SAMPLING SYSTEM FOR E-BEAM IMAGE ENHANCEMENT

CROSS-REFERENCE TO RELATED APPLICATIONS

This application claims priority of U.S. application 62/787,031 which was filed on Dec. 31, 2018, and which is incorporated herein in its entirety by reference.

FIELD

The present disclosure relates generally to systems for image acquisition and image enhancement methods, and more particularly, to systems for and methods of improving metrology by automatically obtaining training images to train a machine learning model that improves image quality.

BACKGROUND

In manufacturing processes used to make integrated circuits (ICs), unfinished or finished circuit components are inspected to ensure that they are manufactured according to design and are free of defects. Inspection systems utilizing optical microscopes or charged particle (e.g., electron) beam microscopes, such as a scanning electron microscope (SEM), can be employed. As the physical sizes of IC components continue to shrink, accuracy and yield in defect detection become more and more important. However, imaging resolution and throughput of inspection tools struggle to keep pace with the ever-decreasing feature size of IC components. Further improvements in the art are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, there is provided a method of automatically obtaining training images to train a machine learning model. The method may comprise analyzing a plurality of patterns of data relating to a layout of a product to identify a plurality of training locations on a sample of the product to use in relation to training the machine learning model. The method may comprise obtaining a first image having a first quality for each of the plurality of training locations, and obtaining a second image having a second quality for each of the plurality of training locations, the second quality being higher than the first quality. The method may comprise using the first image and the second image to train the machine learning model.

In another aspect of the disclosure, there is provided an apparatus for automatically obtaining training images to train a machine learning model. The apparatus may comprise a memory, and one or more processors coupled to the memory. The processor(s) may be configured to analyze a plurality of patterns of data relating to a layout of a product to identify a plurality of training locations on a sample of the product to use in relation to training the machine learning model. The processor(s) may be further configured to obtain a first image having a first quality for each of the plurality of training locations, and obtain a second image having a second quality for each of the plurality of training locations, the second quality higher than the first quality. The processor(s) may be further configured to use the first image and the second image to train the machine learning model.

In another aspect of the disclosure, there is provided a non-transitory computer readable medium storing a set of instructions that is executable by a controller of a device to cause the device to perform a method comprising: analyzing a plurality of patterns of data relating to a layout of a product to identify a plurality of training locations on a sample of the product to use in relation to training the machine learning model; obtaining a first image having a first quality for each of the plurality of training locations; obtaining a second image having a second quality for each of the plurality of training locations, the second quality higher than the first quality; and using the first image and the second image to train the machine learning model.

In another aspect of the disclosure, there is provided an electron beam inspection apparatus comprising a controller having circuitry to cause the electron beam inspection apparatus to perform: analyzing a plurality of patterns of data relating to a layout of a product to identify a plurality of training locations on a sample of the product to use in relation to training the machine learning model; obtaining a first image having a first quality for each of the plurality of training locations; obtaining a second image having a second quality for each of the plurality of training locations, the second quality being higher than the first quality; and using the first image and the second image to train the machine learning model.

To accomplish the foregoing and related ends, aspects of embodiments comprise the features hereinafter described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF FIGURES

FIGS. 5A-5C illustrate a plurality of design patterns of a graphic database system (GDS) of a product, according to some aspects of the present disclosure.

FIG. 6A is a flow diagram illustrating an example of a method of automatically obtaining training images to train a machine learning model, according to some aspects of the present disclosure.

DETAILED DESCRIPTION

Figure 1:
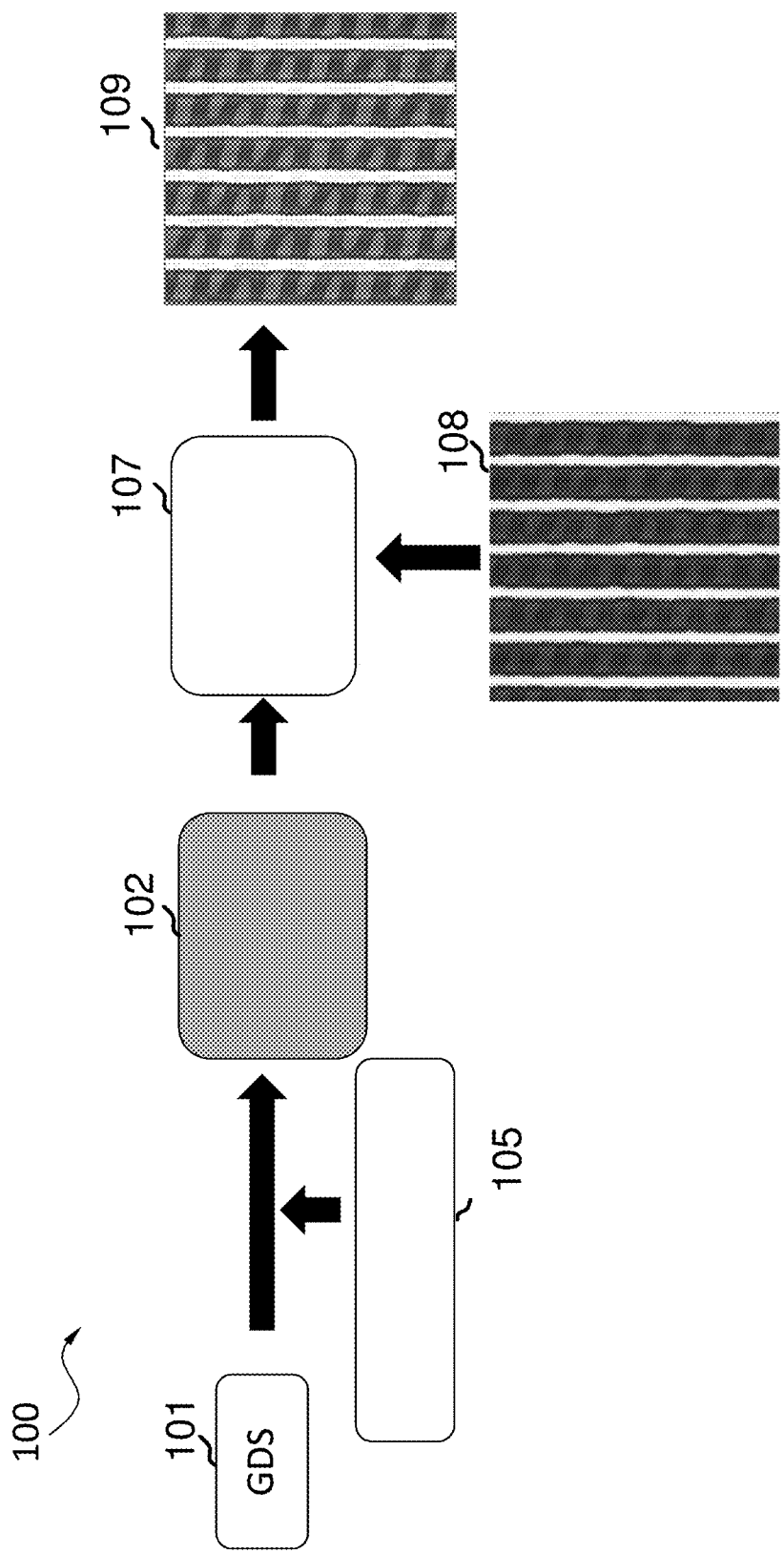
FIG. 1 is a flow diagram of a process for improving images obtained by a SEM sampling system.

Reference will now be made in detail to example aspects of embodiments, examples of which are illustrated in the accompanying drawings. The following description refers to the accompanying drawings in which the same numbers in different drawings represent the same or similar elements unless otherwise represented. The implementations set forth in the following description of example aspects of embodiments do not represent all implementations consistent with the invention. Instead, they are merely examples of apparatuses and methods consistent with aspects of embodiments related to the invention as recited in the claims. For example, although some aspects of embodiments are described in the context of utilizing electron beam inspection (EBI) system such as scanning electron microscope (SEM) for generation of a wafer image, the disclosure is not so limited. Other types of inspection system and image generation system be similarly applied.

The enhanced computing power of electronic devices, while reducing the physical size of the devices, can be accomplished by significantly increasing the packing density of circuit components such as, transistors, capacitors, diodes, etc. on an IC chip. For example, in a smart phone, an IC chip (which is the size of a thumbnail) may include over 2 billion transistors, the size of each transistor being less than $1/1000^{th}$ of a human hair. Not surprisingly, semiconductor IC manufacturing is a complex process, with hundreds of individual steps. Errors in even one step have the potential to dramatically affect the functioning of the final product. Even one "killer defect" can cause device failure. The goal of the manufacturing process is to improve the overall yield of the process. For example, for a 50-step process to get 75% yield, each individual step must have a yield greater than 99.4%, and if the individual step yield is 95%, the overall process yield drops to 7%.

In various steps of the semiconductor manufacturing process, pattern defects can appear on at least one of a wafer, a chip, or a mask, which can cause a manufactured semiconductor device to fail, thereby reducing the yield to a great degree. As semiconductor device sizes continually become smaller and smaller (along with any defects), identifying defects becomes more challenging and costly. Currently, engineers in semiconductor manufacturing lines spend usually hours (and even sometimes days) to identify locations of small detects to minimize their impact on the final product.

Conventional optical inspection techniques are ineffective in inspecting for small defects (e.g., nanometer scale defects). Advanced electron-beam inspection (EBI) tools, such as an SEM with high resolution and large depth-of-focus, have been developed to meet the need in the semiconductor industry. E-beam images may be used in monitoring semiconductor manufacturing processes, especially for more advanced nodes where optical inspection falls short of providing enough information.

An E-beam image may be characterized according to one or more qualities, such as contrast, brightness, noise level, etc. In general, a low quality images often requires less parameter tuning and fewer scans, but the information embedded in the low quality images (such as defect types and locations) is hard to extract, which may have a negative impact on the analyses. High quality images which do not suffer from this problem may be obtained by an increased number of scans. However, high quality images may have a low throughput.

Further, an E-Beam image acquisition procedure may go through many steps, such as identifying the pattern of interests, setting up scanning areas for inspection, tuning SEM conditions, determining quality enhancement methods, etc. Many of these settings and parameters are contributing factors to both the system throughput and the E-beam image quality. There may be a trade-off between the throughput and image quality.

In order to obtain high quality images and at the same time achieve a high throughput, an operator generally needs to set many parameters and make decisions as to how the images should be obtained. However, determining these parameters is often not straightforward. To minimize possible operator-to-operator variation, machine learning based enhancement methods can be trained to learn the enhancement framework/network. In such cases, the acquisition of sufficient and representative training samples is advantageous to increase the final performance of the trained system. However, common procedures to obtain SEM image samples require significant human intervention, including searching the proper design patterns for scanning, determining a number of images to collect and various imaging conditions, etc. Such intensive human involvement impedes full utilization of the advanced machine learning based enhancement methods. Therefore, there is a need to develop a fully automated smart sampling system for E-beam images quality enhancement.

Disclosed herein, among other things, is equipment that automatically obtains training images to train a machine learning model that improves image quality, and methods used by the equipment. Electron-beam (E-beam) imaging plays an important role in inspecting very small defects (e.g., nanometer scale defects with a nanometer bring 0.000000001 meters) in semiconductor manufacturing processes. In general, it is possible to obtain many relatively low quality E-beam images very quickly, but the images may not provide enough useful information about issues such as defect types and locations. On the other hand, it is possible to obtain high quality images but doing so takes more time and so decreases the speed at which devices can be analyzed. This increases manufacturing costs. Samples may be scanned multiple times to improve image quality, such as by reducing noise by averaging over multiple images. However, scanning each sample multiple times reduces the system throughput and may cause charge build up or may damage the sample.

Some of the systems and methods disclosed herein embody ways to achieve high quality images with a reduced number of scans of a sample, in some embodiments by automatically selecting sample locations to use to generate training images for a machine learning (ML) algorithm. The term "quality" refers to a resolution, a contrast, a sensitivity, a brightness, or a noise level, etc. Some of the systems and methods disclosed herein may obtain the benefit of higher quality images without excessively slowing down production. Some embodiments of the systems may automatically analyze a plurality of patterns of data relating to a layout of a product, in order to identify multiple training locations on a sample of the product to use in relation to training a machine learning model. The patterns of data may be SEM images of the product, or a layout design (e.g., graphics database system (GDS), Open Artwork System Interchange Standard (OASIS), Caltech Intermediate Format (CIF), etc.) representation of a product). As an example, a GDS analyzer may be used to determine good locations on a sample to use for training the ML algorithm. These locations are scanned multiple times, resulting in asset of images, some of which incrementally improve with each scan, such as due to noise averaging or using a higher resolution setting on the SEM. These images (e.g., lower quality images and associated higher quality images) are used as training samples to train the ML algorithm. Other locations on the sample are scanned a reduced number of times, and the ML algorithm modifies the image to approximate how it would incrementally improve with additional scans or with a scan using a higher resolution setting.

The disclosure provides, among others, a method of automatically obtaining training images to train a machine learning model that improves image quality. The method may comprise analyzing a plurality of patterns of data relating to a layout of a product to identify a plurality of training locations on a sample of the product to use in relation to training the machine learning model. For example, the method may comprise analyzing a plurality of patterns from a graphic database system (GDS) of a product, and identifying a plurality of training locations on a sample of the product to use in relation to training the machine learning model based on the analyzing.

As an example, the method may obtain one or more low quality images and one or more high quality images for each of the multiple training locations. The method may use the low quality image(s) and the high quality image(s) to train the machine learning model. For example, the machine learning model can learn how an image changes between a low quality image and a high quality image, and can be trained to generate an image that approximates a high quality image from a low quality image. After the training, the machine learning model may be used to automatically generate high quality images from low quality images for the product. In this way, the high quality images may be obtained quickly. Further, the method may minimize the amount of human supervision required, prevent inconsistency that would otherwise result from used by different operators, and avoid various human errors. Therefore, the method may increase inspection accuracy. Accordingly, the method may increase manufacturing efficiency and reduce the manufacturing cost.

As an example, the method may further comprise using the machine learning model to modify an image to approximate a result obtained with an increased number of scans. The term "approximate" refers to come close or be similar to in quality. For example, a quality of an image using the machine learning model may be within 5%, 10%, 15%, or 20% of a quality from an image obtained with an increased number of scans.

Some of the methods disclosed herein are advantageous for generating high quality images with high throughput. Further, some of the methods may require minimal human intervention, reducing or eliminating inconsistency from different operators and various human errors, and thereby increasing the accuracy of the inspection. In this way, manufacturing efficiency may be increased and the manufacturing cost may be reduced.

Some disclosed embodiments provide a fully automated smart E-beam image sampling system for E-beam image enhancement, which comprises a GDS pattern analyzer and a smart inspection sampling planner for collecting sample images to feed into a machine learning quality enhancement system to generate non-parameterized quality enhancement modules. The automated smart E-beam image sampling system can be used to enhance lower quality images collected from higher throughput mode. The automated smart E-beam image sampling system is advantageous to require minimum human intervention and generate high quality images with high throughput for inspection and metrology analysis. Advantageously, the automated smart E-beam image sampling system can increase manufacturing efficiency and reduce manufacturing cost.

FIG. 1 is a flow diagram 100 of a process for improving images obtained by SEM sampling system 102, according to some aspects of the disclosure. The automated smart SEM sampling system 102 may, for example, be EBI system 300 of FIG. 3. The SEM sampling system 102 may be configured to obtain training images to train a machine learning model that improves image quality. The automated smart SEM sampling system 102 may be configured to analyze a plurality of patterns of data relating to a layout of a product to identify a plurality of training locations on a sample of the product to use in relation to training the machine learning model. For example, the data may be in a database. For example, the database may be any one of a GDS, an Open Artwork System Interchange Standard, or a Caltech Intermediate Form. For example, the GDS may include both GDS and GDSII. Further, the automated smart SEM sampling system 102 may comprise a GDS pattern analyzer that is configured to analyze a plurality of patterns from a graphic database system (GDS) 101 of a product. The automated smart SEM sampling system 102 may additionally comprise a smart inspection sampling planner that is configured to identify a plurality of training locations on a sample of the product to use in relation to training the machine learning model based on the analyzing.

The automated smart SEM sampling system 102 may be configured to obtain a first image having a first quality for each of the plurality of training locations. For example, the system 102 may be configured to enable a first scan for each of the plurality of training locations to obtain a first image for each of the plurality of training locations. The automated smart SEM sampling system 102 may be configured to obtain the first image for each of the plurality of training locations based on the first scan. Further, the system 102 may be configured to obtain more than one first image having a first quality for each of the plurality of training locations. For example, the first scan may include a low number of scans and the first image may be a low quality image. The low number of scans may be a number of scans in a range of about, e.g., 1 to about 10. The automated smart SEM sampling system 102 may be configured to obtain a second image for each of the plurality of training locations, wherein the second image has a second quality higher than the first quality. For example, the second image may be a high quality image. The second image may be a higher quality image due to having a higher resolution, a higher contrast, a higher sensitivity, a higher brightness, or a lower noise level, etc., or some combination of these.

For example, the system 102 may be configured to obtain more than one second image having a second quality for each of the plurality of training locations. As an example, the second image may be obtained by enabling a second set (or series) of scans, where the set (or series) of scans can include an increased number of scans, thereby resulting in a higher quality image. For example, the increased number of scans may be a number of scans in the range of about 32 to about 256. As another example, a higher quality image may be obtained by taking a number of low quality images, and averaging the images, to result in a higher quality image (due to, e.g., less noise as a result of the averaging). As still another example, a higher quality image may be obtained by combining a number of low quality images to result in a higher quality image. As yet another example, the second image may be received as a reference image by an optional user input, as illustrated at 105. As one more example, the second image may be obtained based on an improved quality scan, such as a scan with a higher resolution or other setting change(s) that result in an improved quality scan.

The automated smart SEM sampling system 102 may use the first image and the second image for each of the plurality of training locations as training images to train the machine learning model. In some aspects, the automated smart SEM sampling system 102 may be configured to enable scanning each of the training locations a plurality of times to create a plurality of training images for each location, where some of the training images reflect an improvement in image quality that results from an additional number of scans of a training location. For example, a plurality of low quality image and high quality image pairs may be obtained and used as training images to train the machine learning model. For example, the automated smart SEM sampling system 102 may collect sample images (e.g., the training image pairs) to feed into a machine learning based quality enhancement system 107 to generate non-parameterized quality enhancement modules. The automated smart SEM sampling system can be used to enhance low quality images 108 collected during operation in a high throughput mode to generate enhanced high quality images 109. For example, the automated smart SEM sampling system 102 may be configured to use the machine learning model to modify an image to approximate a result obtained with an increased number of scans. The fully automated smart SEM sampling system 102 has the advantage of requiring a minimal amount of human intervention while being able to generate high quality images with high throughput for inspection and metrology analysis.

Figure 2:
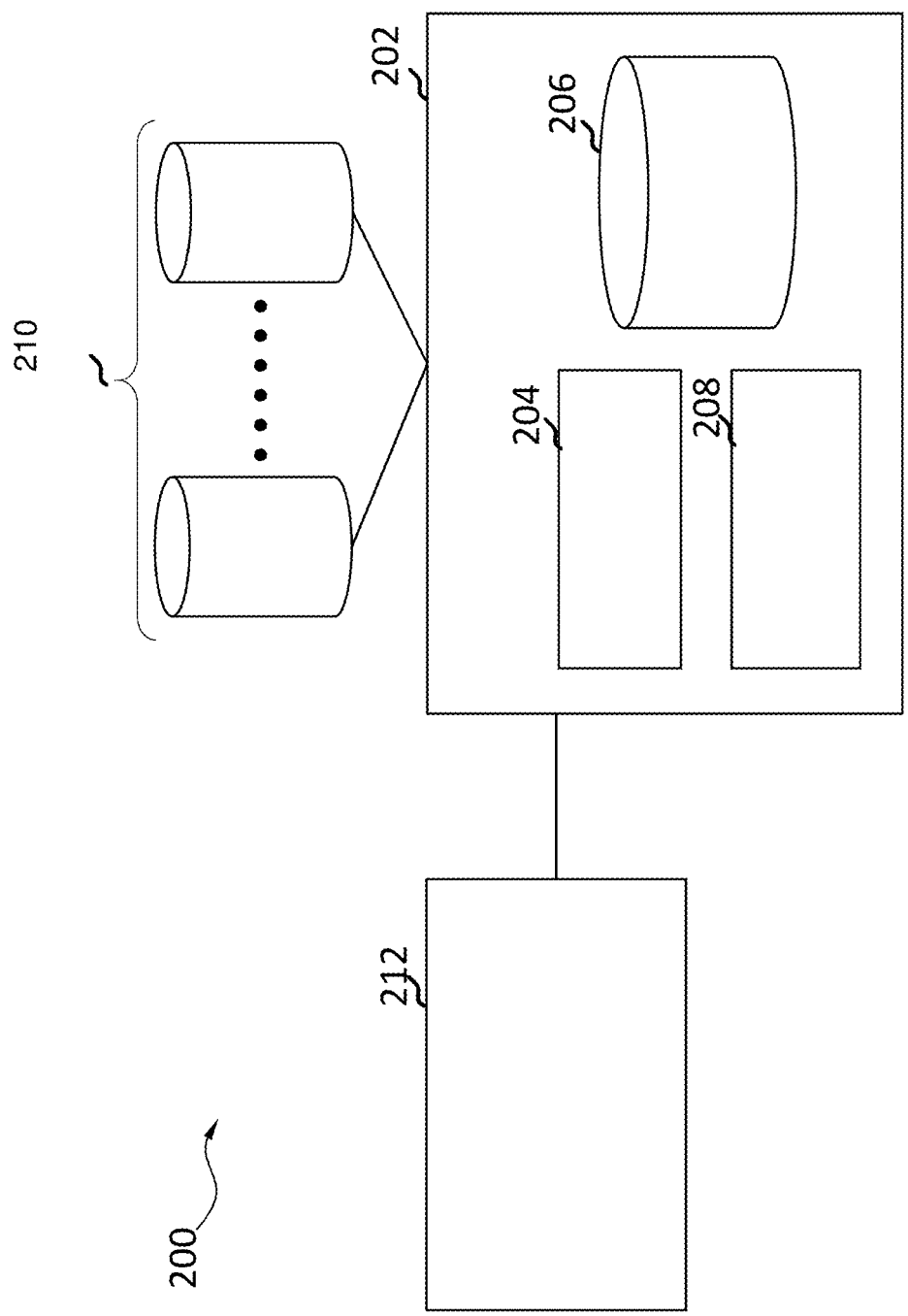
FIG. 2 is a block diagram illustrating an example of an automatic SEM sampling system, according to some aspects of the present disclosure.

FIG. 2 is a block diagram 200 illustrating an example of an automated SEM sampling system 202, according to some aspects of the present disclosure. As shown in FIG. 2, the automated SEM sampling system 200 may comprise a computer system 202 (e.g., computer system 309 in FIG. 3), which is in communication with an inspection system 212 and a reference storage device 210. For example, the inspection system 212 may be an EBI tool (e.g., EBI system 300 of FIG. 3). The computer system 202 may comprise a processor 204, a storage medium 206 and a user interface 208. The processor 204 can comprise multiple processors, and the storage medium 206 and the reference storage device 210 can be a same single storage medium. The computer system 202 may be in communication with the inspection system 212 and the reference storage device 210 via wired or wireless communications. For example, the computer system may be a controller of the EBI tool, and the controller may have circuitry to cause the EBI tool to perform automated SEM sampling.

The computer system 202 may include, but is not limited to, a personal computer, a workstation, a network computer or any device having one or more processors. The storage medium 206 stores SEM sampling instructions and the processor 204 is configured (via its circuitry) to execute the SEM sampling instructions to control the automated SEM sampling process. The processor 204 may be configured to obtain training images to train a machine learning model that improves image quality, as described in connection with FIG. 1. For example, the processor 204 may be configured to analyze a plurality of GDS patterns of a product and identify a plurality of training locations on a sample of the product. The processor 204 may communicate with the inspection system 212 to enable a first scan for each of the plurality of training locations to obtain a first image for each of the plurality of training locations. For example, the processor 204 may instruct the inspection system 212 to perform the first scan to obtain the at least one image, which may be a low quality image with a lower number of scans. The processor 204 may obtain the first image for each of the plurality of training locations based on the first scan from the inspection system 212. The processor 204 may further obtain a second image, which may be a high quality image, for each of the plurality of training locations. For example, the processor 204 may instruct the inspection system 212 to perform a second scan with an increased number of scans to obtain the high quality image. For another example, the processor 204 may obtain the high quality image as a reference image from reference storage device 210, by an optional user input. The processor 202 may be configured to use the first image (e.g., low quality image) and the second image (e.g., high quality image) for each of the plurality of training locations as training images to train the machine learning model. In some aspects, a plurality of low quality image and high quality image pairs may be obtained and used as training images to train the machine learning model. The processor 204 may be further configured to use the machine learning model to modify a first image of a new location with a low quality and generate a high quality image of the new location.

The user interface 208 may include a display configured to display an image of a wafer, an input device configured to transmit user command to computer system 202, etc. The display may be any type of a computer output surface and projecting mechanism that shows text and graphic images, including but not limited to, cathode ray tube (CRT), liquid crystal display (LCD), light-emitting diode (LED), gas plasma, a touch screen, or other image projection technologies, for displaying information to a computer user. The input device may be any type of a computer hardware equipment used to provide data and control signals from an operator to computer system 202. The input device may include, but is not limited to, a keyboard, a mouse, a scanner, a digital camera, a joystick, a trackball, cursor direction keys, a touchscreen monitor, or audio/video commanders, etc., for communicating direction information and command selections to processor or for controlling cursor movement on display.

The reference storage device 210 may store a reference file database that is accessed by computer system 202 during the automated SEM sampling process. In some embodiments, reference storage device 210 may be a part of computer system 202. The reference image file for inspection of the wafer can be manually provided to computer system 202 by a human operator. Alternatively, reference storage device 210 may be implemented with a processor and the reference image file can be automatically provided to computer system 202 by reference storage device 210. Reference storage device 210 may be a remote server computer configured to store and provide any reference images, may be cloud storage, etc.

Inspection system 212 can be any inspection system that can generate an image of a wafer. For example, the wafer can be a sample of the product, of which the plurality of design patterns of the GDS is analyzed by the processor 204. The wafer can be a semiconductor wafer substrate, a semiconductor wafer substrate having one or more epitaxial layers or process films, etc. The embodiments of the present disclosure are not limited to use in a specific type for wafer inspection system 212 as long as the wafer inspection system can generate a wafer image having a resolution high enough to observe key features on the wafer (e.g., less than 20 nm), consistent with contemporary semiconductor foundry technologies. In some aspects of the present disclosure, inspection system 212 is an electron beam inspection (EBI) system 304 described with respect to FIG. 3.

Once a wafer image is acquired by inspection system 212, the wafer image may be transmitted to computer system 202. Computer system 202 and reference storage device 210 may be part of or remote from inspection system 212.

In some aspects of embodiments, the automated SEM sampling system 202 may further comprise the inspection system 212 and the reference storage device 210. For example, the automated SEM sampling system 202 may be further configured to perform a first scan for each of the plurality of training locations to obtain at least one first image for each of the plurality of training locations. For another example, the automated SEM sampling system 202 may be further configured to perform a second scan for each of the plurality of training locations to obtain the at least one second image for each of the plurality of training locations. For example, the at least one second image may have an enhanced quality resulted from an increased number of scans.

Figure 3:
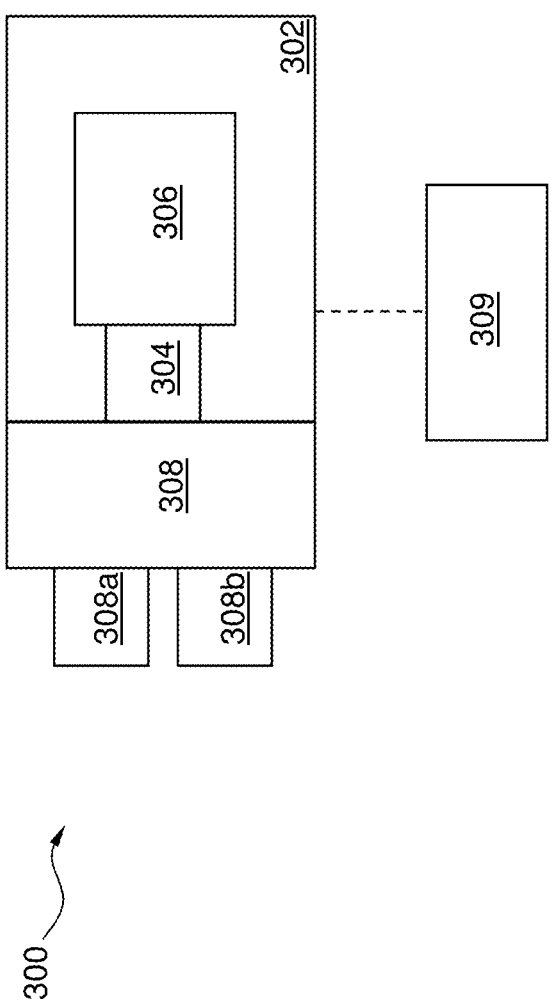
FIG. 3 is a schematic diagram illustrating an example of an electron beam inspection (EBI) system, according to some aspects of the present disclosure.

FIG. 3 is a schematic diagram illustrating an example electron beam inspection system, according to some aspects of the present disclosure. As shown in FIG. 3, electron beam inspection system 300 includes a main chamber 302, a load/lock chamber 304, an electron beam tool 306, a computer system 309, and an equipment front end module 308. The computer system 309 may be a controller of the electron beam inspection system 300. Electron beam tool 306 is located within main chamber 302. Equipment front end module 308 includes a first loading port 308a and a second loading port 308b. Equipment front end module 308 may include additional loading port(s). First loading port 308a and second loading port 308b receive wafer cassettes that contain wafers (e.g., semiconductor wafers or wafers made of other material(s)) or samples to be inspected (wafers and samples are collectively referred to as "wafers" hereafter). One or more robot arms (not shown) in equipment front end module 308 transport the wafers to load/lock chamber 304. Load/lock chamber 304 is connected to a load/lock vacuum pump system (not shown) which removes gas molecules in load/lock chamber 304 to reach a first pressure below the atmospheric pressure. After reaching the first pressure, one or more robot arms (not shown) transport the wafer from load/lock chamber 304 to main chamber 302. Main chamber 302 is connected to a main chamber vacuum pump system (not shown) which removes gas molecules in main chamber 302 to reach a second pressure below the first pressure. After reaching the second pressure, the wafer is subject to inspection by electron beam tool 306. The electron beam tool 306 may scan a location a plurality of times to obtain an image. In general, a low quality image may be obtained by a low number of scans with a high throughput, and a high quality may be obtained by a high number of scans with a low throughput.

Figure 4:
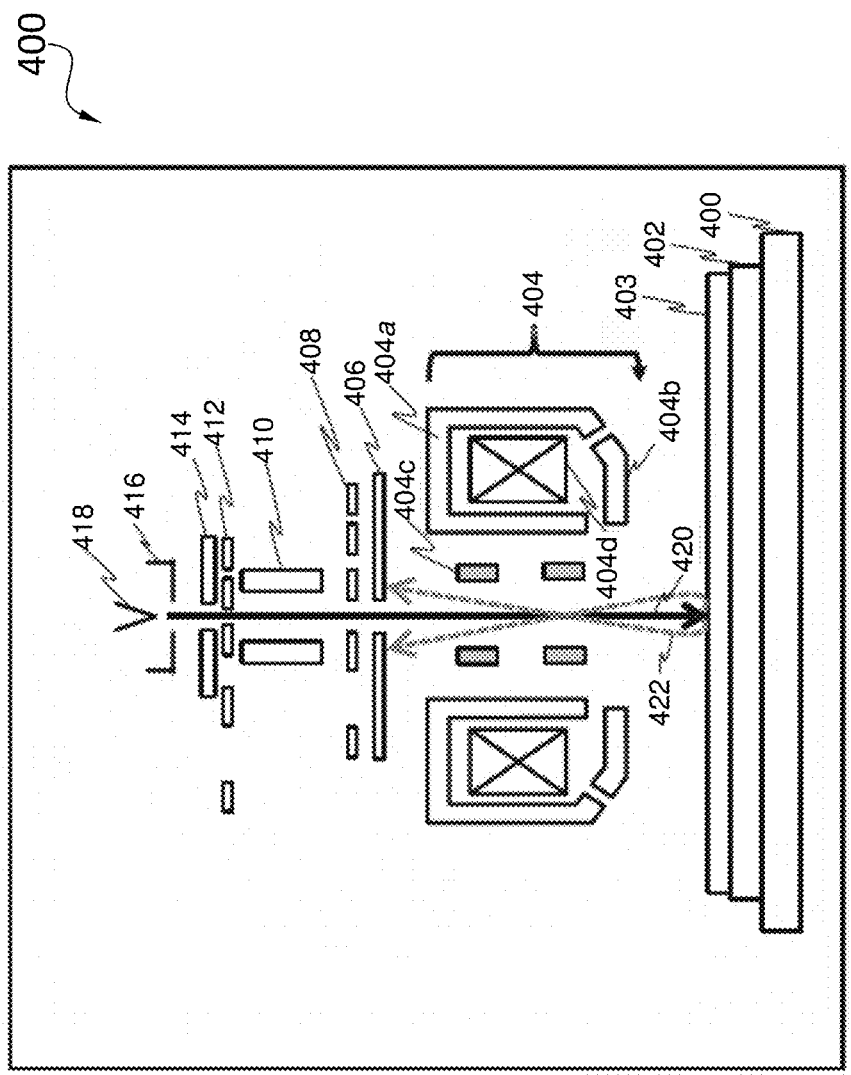
FIG. 4 is a schematic diagram illustrating an example of an electron beam tool that can be a part of the example electron beam inspection (EBI) system of FIG. 3, according to some aspects of the present disclosure.

FIG. 4 is a schematic diagram illustrating an example of an electron beam tool 400 (e.g., 306) that can be a part of the example electron beam inspection system of FIG. 3, according to some aspects of the present disclosure. FIG. 4 illustrates examples of components of electron beam tool 306, according to some aspects of the present disclosure. As shown in FIG. 4, the electron beam tool 400 may include a motorized stage 400, and a wafer holder 402 supported by motorized stage 400 to hold a wafer 403 to be inspected. Electron beam tool 400 further includes an objective lens assembly 404, electron detector 406 (which includes electron sensor surfaces), an objective aperture 408, a condenser lens 410, a beam limit aperture 412, a gun aperture 414, an anode 416, and a cathode 418. Objective lens assembly 404, in some aspects, can include a modified swing objective retarding immersion lens (SORIL), which includes a pole piece 404a, a control electrode 404b, a deflector 404c, and an exciting coil 404d. The electron beam tool 400 may additionally include an energy dispersive X-ray spectrometer (EDS) detector (not shown) to characterize the materials on the wafer.

A primary electron beam 420 is emitted from cathode 418 by applying a voltage between anode 416 and cathode 418. Primary electron beam 420 passes through gun aperture 414 and beam limit aperture 412, both of which can determine the size of electron beam entering condenser lens 410, which resides below beam limit aperture 412. Condenser lens 410 focuses primary electron beam 420 before the beam enters objective aperture 408 to set the size of the electron beam before entering objective lens assembly 404. Deflector 404c deflects primary electron beam 420 to facilitate beam scanning on the wafer. For example, in a scanning process, deflector 404c can be controlled to deflect primary electron beam 420 sequentially onto different locations of top surface of wafer 403 at different time points, to provide data for image reconstruction for different parts of wafer 403. Moreover, deflector 404c can also be controlled to deflect primary electron beam 420 onto different sides of wafer 403 at a particular location, at different time points, to provide data for stereo image reconstruction of the wafer structure at that location. Further, in some aspects, anode 416 and cathode 418 may be configured to generate multiple primary electron beams 420, and electron beam tool 400 may include a plurality of deflectors 404c to project the multiple primary electron beams 420 to different parts/sides of the wafer at the same time, to provide data for image reconstruction for different parts of wafer 203.

Exciting coil 404d and pole piece 404a generate a magnetic field that begins at one end of pole piece 404a and terminates at the other end of pole piece 404a. A part of wafer 403 being scanned by primary electron beam 420 can be immersed in the magnetic field and can be electrically charged, which, in turn, creates an electric field. The electric field reduces the energy of impinging primary electron beam 420 near the surface of the wafer before it collides with the wafer. Control electrode 404b, being electrically isolated from pole piece 404a, controls an electric field on the wafer to prevent micro-arching of the wafer and to ensure proper beam focus.

A secondary electron beam 422 can be emitted from the part of wafer 403 upon receiving primary electron beam 420. Secondary electron beam 422 can form a beam spot on a surface of a sensor of electron detector 406. Electron detector 406 can generate a signal (e.g., a voltage, a current, etc.) that represents an intensity of the beam spot and provide the signal to a processing system (not shown). The intensity of secondary electron beam 422, and the resultant beam spot, can vary according to the external or internal structure of wafer 403. Moreover, as discussed above, primary electron beam 420 can be projected onto different locations of the top surface of the wafer to generate secondary electron beams 422 (and the resultant beam spot) of different intensities. Therefore, by mapping the intensities of the beam spots with the locations of wafer 403, the processing system can reconstruct an image that reflects the internal or external structures of wafer 403. Once a wafer image is acquired by electron beam tool 400, the wafer image may be transmitted to computer system 402 (e.g., 202, as shown in FIG. 2).

FIGS. 5A-5C illustrate a plurality of design patterns of a database such as a GDS database of a product, according to some aspects of the present disclosure. The automated SEM sampling system disclosed herein may be configured to perform a method of automatically obtaining training images to train a machine learning model that improves image quality. For example, the automated SEM sampling system may be a controller of the EBI tool, and the controller may have circuitry to cause the EBI tool to perform automated SEM sampling. For example, the automated SEM sampling system may comprise a GDS analyzer (e.g., a GDS analyzer component). The GDS analyzer may be configured to perform pattern analysis and classification based on various features, i.e. line pattern, logic pattern, 1D/2D pattern, dense/isolated pattern, etc. Same patterns may be grouped together via pattern grouping.

For example, a plurality of manufacture design patterns may be rendered from a GDS input. At this stage, the plurality of patterns are scattered patterns. Various features of each pattern may analyzed and extracted, such as a pattern location within a die, a shape, a size, a density, a neighborhood layout, a pattern type, etc.

Further, the plurality of design patterns may be classified into different categories based on the extracted features. As illustrated in FIGS. 5A-5C, a subset of patterns with a similar or same shape may be grouped together via pattern grouping. For example, a first subset of patterns, Group 1, may include patterns with a same or similar shape to pattern 501*a*. For example, a second subset of patterns, Group 2, may include patterns with a same or similar shape to pattern 501*b*. For example, a third subset of patterns, Group 3, may include patterns with a same or similar shape to pattern 501*c*. Each pattern group may be associated with corresponding metadata, which may include information of a pattern location within a die, pattern type, shape, size and other extracted features.

The automated SEM sampling system may comprise a smart inspection sampling planner (e.g., an inspection sampling planner component). The smart inspection sampling planner may identify a plurality of training locations on a sample of the product to use in relation to training the machine learning model based on the analyzing results of the analyzer. The GDS database of the product may have information regarding a location associated with each pattern group. Thus, the design patterns rendered from the GDS may contain location information. Therefore, by analyzing and recognizing pattern groups from the GDS, locations of corresponding pattern groups on a wafer of the product may be determined.

Figure 5D:
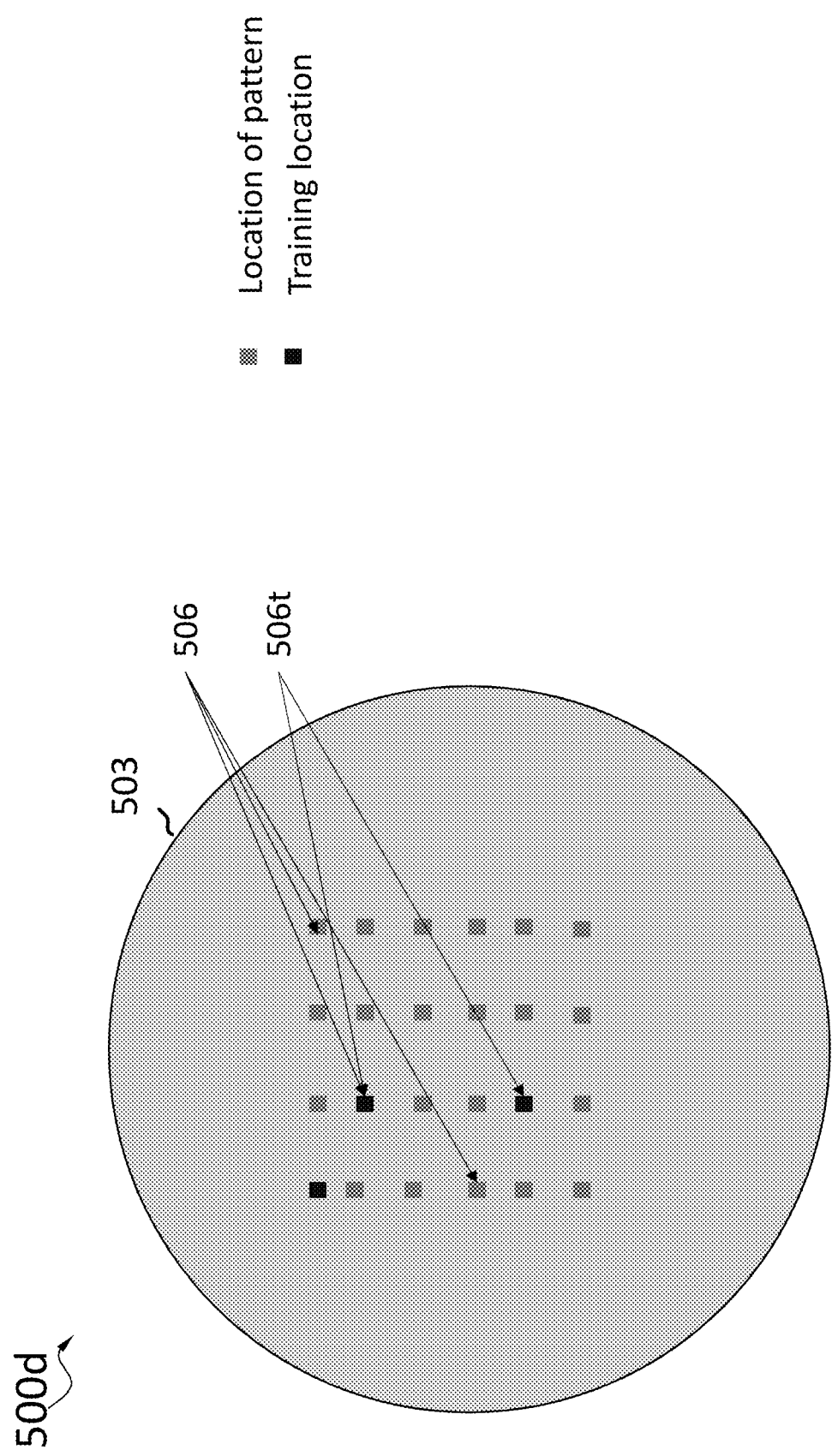
FIG. 5D is a diagram illustrating a plurality of training locations, according to some aspects of the present disclosure.

FIG. 5D is a diagram 500*d* illustrating a plurality of training locations 506*t* on a wafer 503 (e.g. 403, described in connection with FIG. 4). For each pattern group, there are many potential locations 506 to acquire training images, as illustrated in FIG. 5D. The automated SEM sampling system may be further configured to determine one or more specific training locations 506*t* for obtaining training images. For example, the SEM sampling system may identify the one or more training locations based on one or more of a location within a die, an inspection area, a field of view (FOV), or other imaging parameters such as local alignment points (LAPs) and auto-focus points on the covered area in the wafer, from the analyzing results of the analyzer. For example, for each pattern group, the SEM sampling system may determine the one or more training locations based on, at least in part, a location within a die. A planner may automatically generate die sampling across the wafer.

A scanning path may be analyzed and created based on the overall scan areas for all the pattern groups. The scanning path may be determined by a parameter such as location, FOV, etc., or some combination of these. Furthermore, the scanning path along with other parameters, such as FOV, shape, type, etc., may be used according to a recipe for an electron beam tool. The electron beam tool may be configured to follow the recipe to automatically scan and capture training images for the machine learning module. For example, LAPs and auto-focus points may be determined based on the factors such as a number of field of views (FOVs) and a distance between each FOV, etc.

Figure 6B:
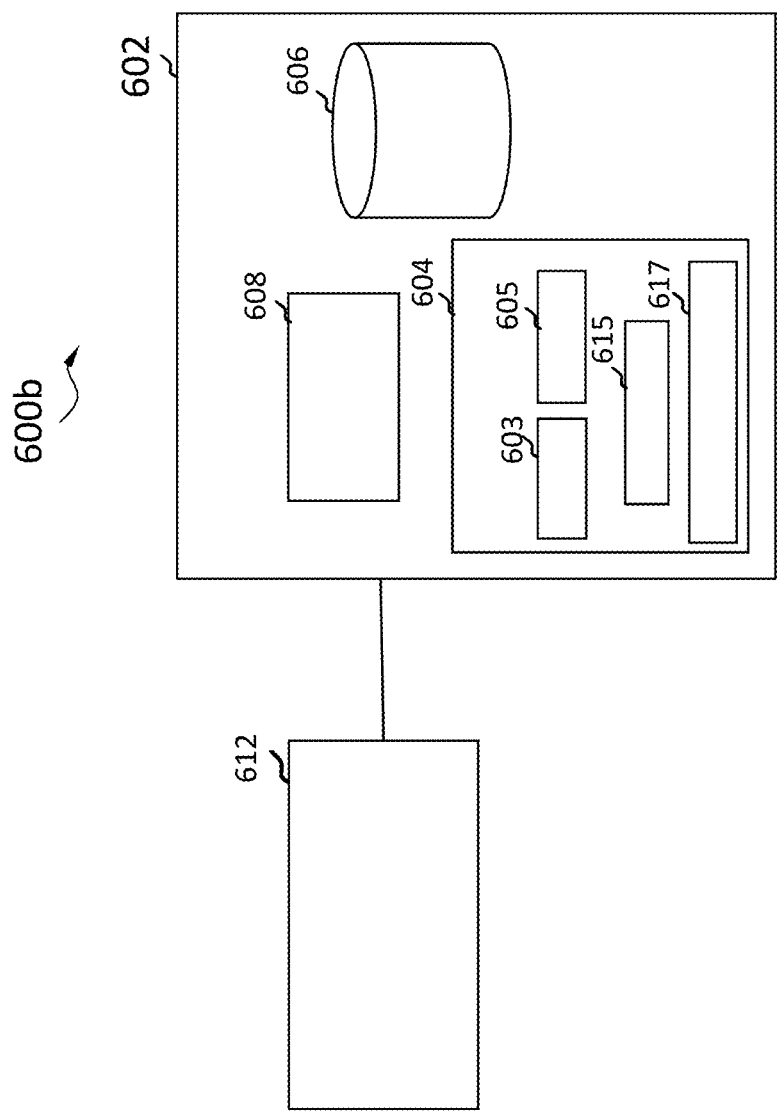
FIG. 6B is a block diagram illustrating details of an automatic SEM sampling system, according to some aspects of the present disclosure.

FIG. 6A is a block diagram 600*a* illustrating a flow diagram of a system for automatically obtaining training images 610 to train a machine learning model 615 that improves image quality, according to some aspects of the present disclosure. FIG. 6B is a block diagram 600*b* illustrating details of an automatic SEM sampling system, according to some aspects of the present disclosure. Referring to FIG. 6A and FIG. 6B, the method implemented by the system may be performed by an automated SEM sampling system 602 (e.g., a processor 604, the computer system 309) communicating with an EBI tool 612 (e.g., the EBI system 300). For example, the automated SEM sampling system may be a controller of the EBI tool, and the controller may have circuitry to cause the EBI tool to perform the method. For example, the method may include performing pattern analysis and classification as by a GDS analyzer 603 (e.g., a GDS analyzer component 603 of the processor). The pattern analysis and classification may be performed based on various features, for example, line pattern, logic pattern, 1D/2D pattern, dense/isolated pattern, etc. The method may further comprise grouping same or similar patterns together via pattern grouping.

The method may comprise, by a sampling planner 605 (e.g., a sampling planner component 605 of the processor), determining scan areas, which are training locations, based on the analyzing results of the step of analyzing. The analyzing results of the step of analyzing may include pattern locations with a die, inspection areas, FOV sizes, and LAP points and auto-focus points and other imaging parameters based on the covered area in the wafer.

The method may comprise, by a user interface 608, enabling scanning each of the training locations a plurality of times to create a plurality of training images 610 for each training location, and obtaining the plurality of training images 610 from the EBI tool 612. For example, some of the plurality of images may be low quality images, e.g., generated using a low number of scans. For example, some of the plurality of images may have enhanced image quality, e.g., generated using an increased number of scans. The enhanced image quality may refer to a higher resolution, a higher contrast, a higher sensitivity, a higher brightness, or a lower noise level, etc. For example, some of the training images 610 may reflect an improvement in image quality that results from the additional number of scans of a training location. In some aspects, a plurality of low quality image and high quality image pairs may be obtained, via the user interface 608, and be used as training images 610 to train the machine learning model 615. For example, a low quality SEM imaging mode may be based on default setting or user-input throughput requirements. For example, a high quality SEM image mode may be based on default setting or user-input quality requirements. In some aspects, a user may also have the option of directly inputting high quality reference image 611. For example, the high quality reference images 611 may be stored in a storage medium 606. In such cases, acquisition of high quality images may be skipped.

The method may further comprise using the machine learning model 615 (e.g., a machine learning model component of the processor) to modify an image to approximate a result obtained with an increased number of scans. Various machine learning methods can be employed in the machine learning model 615 to learn the enhancement framework from the training image pairs 610. The machine learning model 615 may be parametric. Data may be collected for the machine learning model 615.

A quality enhancement module 617 (e.g., a quality enhancement module 617 of the processor) may be learned at the end of the step of using the machine learning model for each type of pattern-of-interest. The quality enhancement module 617 can be used directly for inspection or metrology purpose in a high throughput mode. After being trained based on images sampled from the automatic sampling system 602, the quality enhancement module 617 may be used for image enhancement without training data. Therefore, the quality enhancement module 617 may be a non-parameterized, which does not involve the use of an excessive number of parameter settings that may result in too much overhead. Accordingly, the quality enhancement module 617 is advantageous to generate high quality images with high throughput, thereby increasing manufacturing efficiency and reducing manufacturing cost.

Figure 7:
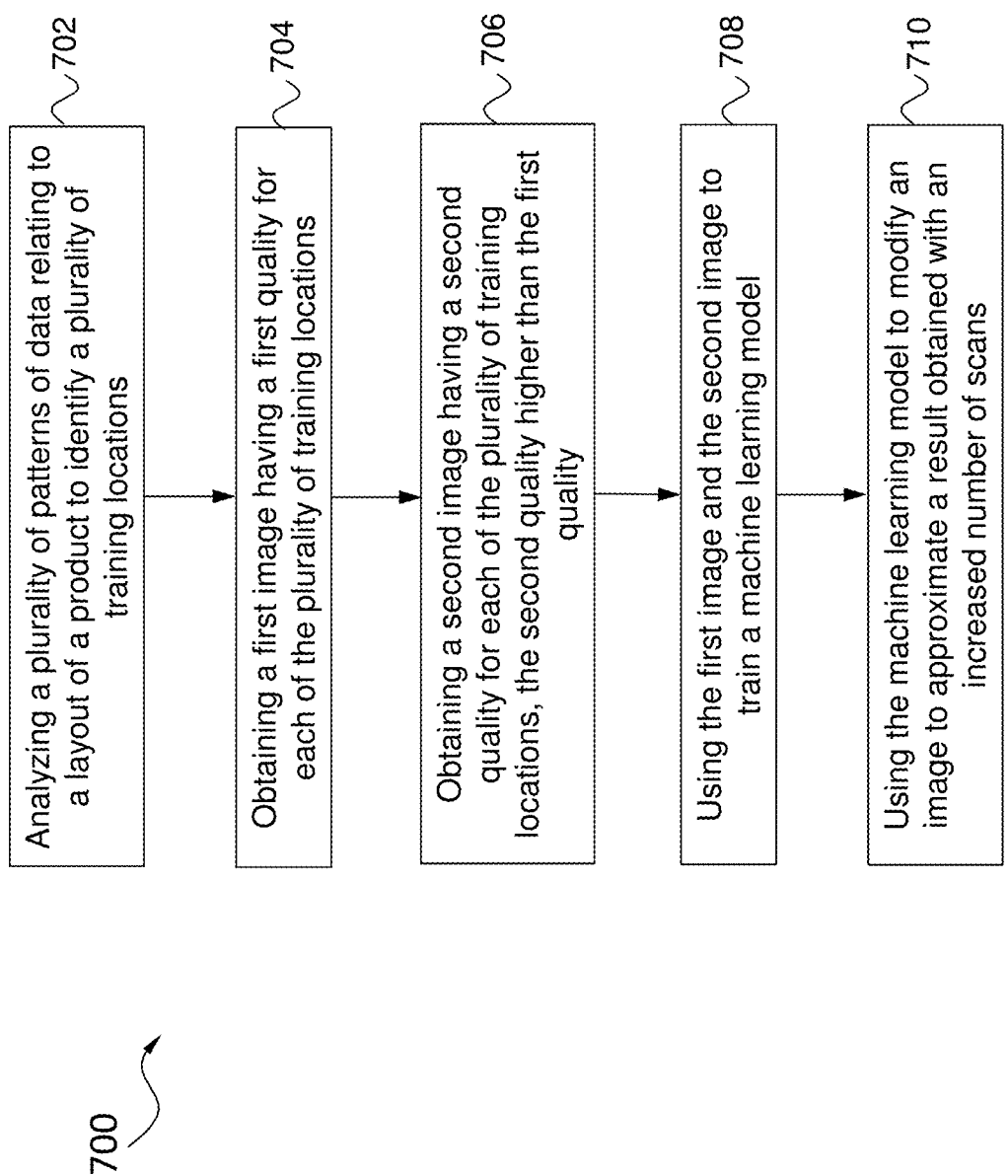
FIG. 7 is a block diagram illustrating an example of a method of automatically obtaining training images to train a machine learning model that improves image quality, according to some aspects of the present disclosure.

FIG. 7 is a flowchart 700 illustrating an example of a method of automatically obtaining training images to train a machine learning model that improves image quality, according to some aspects of the present disclosure. The method may be performed by an automated SEM sampling system (e.g., 102, 202, 602) communicating with an EBI tool (e.g., 212, 612). For example, the automated SEM sampling system may be a controller of the EBI tool, and the controller may have circuitry to cause the EBI tool to perform the method.

As shown in FIG. 7, at step 702, the method may comprise analyzing a plurality of patterns of data relating to a layout of a product to identify a plurality of training locations on a sample of the product to use in relation to training the machine learning model. For example, the data may be in a database. For example, the database may be any one of a graphic database system (GDS), an Open Artwork System Interchange Standard, or a Caltech Intermediate Form, among others. For example, the GDS may include both GDS and GDSII.

For example, the step of analyzing the plurality of patterns of data relating to layout of the product may further comprise classifying the plurality of patterns into a plurality of subsets of patterns. For example, the step of analyzing a plurality of patterns of data relating to layout of a product further may comprise extracting a feature from the plurality of patterns. For example, the classifying the plurality of patterns into a plurality of subsets of patterns may be based on the extracted feature. For example, each subset of the plurality of subsets of patterns may be associated with information relating to a location, a type, a shape, a size, a density or a neighborhood layout. For example, identifying the plurality of training locations may be based on a field of view, a local alignment point, or an auto-focus point. For example, identifying the plurality of training locations may comprise identifying one or more training locations for each subset of patterns.

At step 704, the method may comprise obtaining a first image having a first quality for each of the plurality of training locations. For example, the step of obtaining a first image having a first quality for each of the plurality of training locations comprises obtaining more than one first image having a first quality for each of the plurality of training locations.

For example, the method may further comprise determining a first scanning path including a first scan for obtaining the first image. For example, the first scanning path may be based on an overall scan area for the plurality of training locations. For example, the first scanning path may be determined by some of the parameters such as location, FOV, etc. Furthermore, the first scanning path along with other parameters, such as FOV, shape, type, etc., may provide a first recipe to an electron beam tool. The electron beam tool may be configured to follow the first recipe to automatically scan and capture images for the machine learning module.

At step 706, the method may comprise obtaining a second image having a second quality for each of the plurality of training locations. For example, the second quality may be higher than the first quality. For example, the step of obtaining a second image having a second quality for each of the plurality of training locations comprises obtaining more than one second image having a second quality for each of the plurality of training locations.

For example, the method may comprise determining a second scanning path including a second scan for obtaining the second image. For example, the second scanning path based on an overall scan area for the plurality of training locations. For example, the second scanning path may be determined by some of the parameters such as location, FOV, etc. Furthermore, the second scanning path along with other parameters, such as FOV, shape, type, etc., may provide a second recipe to the electron beam tool. The electron beam tool may be configured to follow the second recipe to automatically scan and capture images for the machine learning module. For example, the first scan may include a first number of scans and the second scan may include a second number of scans, where the second number of scans may be larger than the first number of scans.

For example, the second image may be obtained as a reference image by an optional user input.

At step 708, the method may comprise using the first image and the second image to train the machine learning model.

At step 710, the method may comprise using the machine learning model to modify an image to approximate a result obtained with an increased number of scans.

For example, the method may further comprise using the machine learning model to modify a first image of a location to obtain a second image of the location, where the second image has an enhanced quality than the first image. In this way, the method is advantageous to obtain high quality images with high throughput, thereby increasing manufacturing efficiency and reduce manufacturing cost. Further, the method are fully automatic. Thus, the method may prevent human error and inconsistency from different operators. therefore, the method is further advantageous to increase inspection accuracy.

Now referring back to FIG. 2, the computer system 202 may be a controller of inspection system 212 (e.g., e-beam inspection system) and the controller may include circuitry for: analyzing a plurality of patterns of data relating to a layout of a product to identify a plurality of training locations on a sample of the product to use in relation to training the machine learning model; obtaining a first image having a first quality for each of the plurality of training locations; obtaining a second image having a second quality for each of the plurality of training locations, the second quality higher than the first quality; and using the first image and the second image to train the machine learning model.

Further referring to FIG. 2, the storage medium 206 may be a non-transitory computer readable medium storing a set of instructions that is executable by a controller of a device to cause the device to perform a method comprising: analyzing a plurality of patterns of data relating to a layout of a product to identify a plurality of training locations on a sample of the product to use in relation to training the machine learning model; obtaining a first image having a first quality for each of the plurality of training locations; obtaining a second image having a second quality for each of the plurality of training locations, the second quality higher than the first quality; and using the first image and the second image to train the machine learning model.

The embodiments may further be described using the following clauses:

1. A method of automatically obtaining training images for use in training a machine learning model, the method comprising:
analyzing a plurality of patterns of data relating to layout of a product to identify a plurality of training locations to use in relation to training the machine learning model;
obtaining a first image having a first quality for each of the plurality of training locations;
obtaining a second image having a second quality for each of the plurality of training locations, the second quality being higher than the first quality; and
using the first image and the second image to train the machine learning model.
2. The method of clause 1 wherein the data is in a database.
3. The method of clause 2 wherein the database is any one of a graphic database system (GDS), an Open Artwork System Interchange Standard, or a Caltech Intermediate Form.
4. The method of clause 3 wherein the GDS includes GDS formatted data or GDSII formatted data.
5. The method of clause 1 wherein the step of obtaining a first image having a first quality for each of the plurality of training locations comprises obtaining more than one first image having a first quality for each of the plurality of training locations.
6. The method of clause 1 wherein the step of obtaining a second image having a second quality for each of the plurality of training locations comprises obtaining more than one second image having a second quality for each of the plurality of training locations.
7. The method of clause 1, wherein the step of analyzing the plurality of patterns of data relating to layout of the product further comprises classifying the plurality of patterns into a plurality of subsets of patterns.
8. The method of any one of clauses 1 to 7, wherein the step of analyzing a plurality of patterns of data relating to layout of a product further comprises extracting a feature from the plurality of patterns.
9. The method of clause 8, wherein the extracted feature includes a shape, a size, a density, or a neighborhood layout.
10. The method of clause 7 wherein the classifying the plurality of patterns into a plurality of subsets of patterns is based on the extracted feature.
11. The method of clause 7 wherein each subset of the plurality of subsets of patterns is associated with information relating to a location, a type, a shape, a size, a density or a neighborhood layout.
12. The method of any one of clauses 1 to 11, wherein identifying the plurality of training locations is based on a field of view, a local alignment point, or an auto-focus point.
13. The method of any one of clauses 1 to 12, wherein the method further comprises determining
a first scanning path including a first scan for obtaining the first image, the first scanning path based on an overall scan area for the plurality of training locations.
14. The method of clause 13, wherein the method further comprises
determining a second scanning path including a second scan for obtaining the second image, the second scanning path based on an overall scan area for the plurality of training locations.
15. The method of clause 14, wherein the first scan includes a first number of scans, wherein the second scan includes a second number of scans, and wherein the second number of scans is larger than the first number of scans.
16. The method of any one of clauses 1 to 13, wherein the second image is obtained as a reference image by an optional user input.
17. The method of any one of clauses 1 to 16, further comprising using the machine learning model to modify a first image of a location to obtain a second image of the location, wherein the second image has an enhanced quality than the first image.
18. The method of any one of clauses 1 to 17, wherein identifying the plurality of training locations comprises identifying one or more training locations for each subset of patterns.
19. The method of any one of clauses 1 to 18, wherein the quality includes a resolution, a contrast, a brightness, or a noise level.
20. The method of any one of clauses 1 to 19, further comprising
using the machine learning model to modify an image to approximate a result obtained with an increased number of scans.
21. An apparatus for automatically obtaining training images to train a ML model that improves image quality, the apparatus comprising:
a memory; and
at least one processor coupled to the memory and configured to:
analyze a plurality of patterns of data relating to a layout of a product to identify a plurality of training locations to use in relation to training the machine learning model;
obtain a first image having a first quality for each of the plurality of training locations;
obtain a second image having a second quality for each of the plurality of training locations, the second quality being higher than the first quality; and
use the first image and the second image to train the machine learning model.
22. The apparatus of clause 21 wherein the data is in a database.
23. The apparatus of clause 22 wherein the database is any one of a graphic database system (GDS), an Open Artwork System Interchange Standard, or a Caltech Intermediate Form.
24. The apparatus of clause 23, where the GDS includes GDS formatted data or GDSII formatted data.

25. The apparatus of clause 21 wherein the at least one processor is further configured to obtain more than one first image having a first quality for each of the plurality of training locations.

26. The apparatus of clause 21, wherein the at least one processor is further configured to obtain more than one second image having a second quality for each of the plurality of training locations.

27. The apparatus of clause 21, wherein the at least one processor is further configured to classify the plurality of patterns into a plurality of subsets of patterns.

28. The apparatus of clause 21, wherein the at least one processor is further configured to extract a feature from the plurality of patterns.

29. The apparatus of clause 28, wherein the extracted feature includes a shape, a size, a density, or a neighborhood layout.

30. The apparatus of clause 27, wherein the at least one processor is further configured to classify the plurality of patterns into a plurality of subsets of patterns based on the extracted feature.

31. The apparatus of clause 27, wherein each subset of the plurality of subsets of patterns is associated with information relating to a location, a type, a shape, a size, a density or a neighborhood layout.

32. The apparatus of any one of clauses 21 to 31, wherein the at least one processor is further configured to identify the plurality of training locations based on a field of view, a local alignment point, or an auto-focus point.

33. The apparatus of any one of clauses 21 to 32, wherein the at least one processor is further configured to
determine a first scanning path including a first scan for obtaining the first image, the first scanning path based on an overall scan area for the plurality of training locations.

34. The apparatus of clause 33, wherein the at least one processor is further configured to
determine a second scanning path including a second scan for obtaining the second image, the second scanning path based on an overall scan area for the plurality of training locations.

35. The apparatus of clause 34, wherein the first scan includes a first number of scans, wherein the second scan includes a second number of scans, and wherein the second number of scans is larger than the first number of scans.

36. The apparatus of any one of clauses 21 to 33, wherein the second image is received as a reference image by an optional user input.

37. The apparatus of any one of clauses 21 to 36, wherein the at least one processor is further configured to
use the machine learning model to modify a first image of a location to obtain a second image of the location, wherein the second image has an enhanced quality than the first image.

38. The apparatus of any one of clauses 21 to 37, wherein the at least one processor is further configured to
identify one or more training locations for each subset of patterns.

39. The apparatus of any one of clauses 21 to 38, wherein the quality includes a resolution, a contrast, a brightness, or a noise level.

40. The apparatus of any one of clauses 21 to 39, wherein the at least one processor is further configured to
use the machine learning model to modify an image to approximate a result obtained with an increased number of scans.

41. A non-transitory computer readable medium storing a set of instructions that is executable by a controller of a device to cause the device to perform a method comprising:
analyzing a plurality of patterns of data relating to a layout of a product to identify a plurality of training locations to use in relation to training the machine learning model;
obtaining a first image having a first quality for each of the plurality of training locations;
obtaining a second image having a second quality for each of the plurality of training locations, the second quality being higher than the first quality; and
using the first image and the second image to train the machine learning model.

42. The non-transitory computer readable medium of clause 41 wherein the data is in a database.

43. The non-transitory computer readable medium of clause 42 wherein the database is any one of a graphic database system (GDS), an Open Artwork System Interchange Standard, a Caltech Intermediate Form, or Electronic Design Interchange Format.

44. The non-transitory computer readable medium of clause 43 where the GDS includes at least one of GDS or GDSII.

45. The non-transitory computer readable medium of clause 41 wherein the step of obtaining a first image having a first quality for each of the plurality of training locations further comprises obtaining more than one first image having a first quality for each of the plurality of training locations.

46. The non-transitory computer readable medium of clause 41, wherein the step of obtaining a second image having a second quality for each of the plurality of training locations comprises obtaining more than one second image having a second quality for each of the plurality of training locations.

47. The non-transitory computer readable medium of clause 41, wherein the step of analyzing the plurality of patterns of data relating to layout of the product further comprises classifying the plurality of patterns into a plurality of subsets of patterns.

48. The non-transitory computer readable medium of any one of clauses 41 to 47, wherein the step of analyzing a plurality of patterns of data relating to layout of a product further comprises extracting a feature from the plurality of patterns.

49. The non-transitory computer readable medium of clause 48, wherein the extracted feature includes a shape, a size, a density, or a neighborhood layout.

50. The non-transitory computer readable medium of clause 47, wherein the classifying the plurality of patterns into a plurality of subsets of patterns is based on the extracted feature.

51. The non-transitory computer readable medium of clause 47, wherein each subset of the plurality of subsets of patterns is associated with information relating to a location, a type, a shape, a size, a density or a neighborhood layout.

52. The non-transitory computer readable medium of any one of clauses 41 to 51, wherein identifying the plurality of training locations is based on a field of view, a local alignment point, or an auto-focus point.

53. The non-transitory computer readable medium of any one of clauses 41 to 52, wherein the method further comprises
determining a first scanning path including a first scan for obtaining the first image, the first scanning path based on an overall scan area for the plurality of training locations.

54. The non-transitory computer readable medium of clause 53, wherein the method further comprises
determining a second scanning path including a second scan for obtaining the second image, the second scanning path based on an overall scan area for the plurality of training locations.

55. The non-transitory computer readable medium of clause 54, wherein the first scan includes a first number of scans, wherein the second scan includes a second number of scans, and wherein the second number of scans is larger than the first number of scans.

56. The non-transitory computer readable medium of any one of clauses 41 to 53, wherein the second image is obtained as a reference image by an optional user input.

57. The non-transitory computer readable medium of any one of clauses 41 to 56, wherein the method further comprises using the machine learning model to modify a first image of a location to obtain a second image of the location, wherein the second image has an enhanced quality than the first image.

58. The non-transitory computer readable medium of any one of clauses 41 to 57, wherein identifying the plurality of training locations comprises identifying one or more training locations for each subset of patterns.

59. The non-transitory computer readable medium of any one of clauses 41 to 58, wherein the quality includes a resolution, a contrast, a brightness, or a noise level.

60. The non-transitory computer readable medium of any one of clauses 41 to 59, wherein the method further comprises
using the machine learning model to modify an image to approximate a result obtained with an increased number of scans.

61. An electron beam inspection apparatus, comprising:
a controller having circuitry to cause the electron beam inspection apparatus to perform:
analyzing a plurality of patterns of data relating to a layout of a product to identify a plurality of training locations to use in relation to training the machine learning model;
obtaining a first image having a first quality for each of the plurality of training locations;
obtaining a second image having a second quality for each of the plurality of training locations, the second quality being higher than the first quality; and
using the first image and the second image to train the machine learning model.

62. The electron beam inspection apparatus of clause 61 wherein the data is in a database.

63. The electron beam inspection apparatus of clause 62 wherein the database is any one of a graphic database system (GDS), an Open Artwork System Interchange Standard, or a Caltech Intermediate Form.

64. The electron beam inspection apparatus of clause 63 where the GDS includes at least one of GDS or GDSII.

65. The electron beam inspection apparatus of clause 61 wherein the step of obtaining a first image having a first quality for each of the plurality of training locations comprises obtaining more than one first image having a first quality for each of the plurality of training locations.

66. The electron beam inspection apparatus of clause 61 wherein the step of obtaining a second image having a second quality for each of the plurality of training locations comprises obtaining more than one second image having a second quality for each of the plurality of training locations.

67. The electron beam inspection apparatus of clause 61, wherein the step of analyzing the plurality of patterns of data relating to layout of the product further comprises classifying the plurality of patterns into a plurality of subsets of patterns.

68. The electron beam inspection apparatus of any one of clauses 61 to 67, wherein the step of analyzing a plurality of patterns of data relating to layout of a product further comprises extracting a feature from the plurality of patterns.

69. The electron beam inspection apparatus of clause 68, wherein the extracted feature includes a shape, a size, a density, or a neighborhood layout.

70. The electron beam inspection apparatus of clause 67, wherein the classifying the plurality of patterns into a plurality of subsets of patterns is based on the extracted feature.

71. The electron beam inspection apparatus of clause 67, wherein each subset of the plurality of subsets of patterns is associated with information relating to a location, a type, a shape, a size, a density or a neighborhood layout.

72. The electron beam inspection apparatus of any one of clauses 61 to 71, wherein identifying the plurality of training locations is based on a field of view, a local alignment point, or an auto-focus point.

73. The electron beam inspection apparatus of any one of clauses 61 to 72, wherein the controller having circuitry to cause the electron beam inspection apparatus to further perform:
determining a first scanning path including a first scan for obtaining the first image, the first scanning path based on an overall scan area for the plurality of training locations.

74. The electron beam inspection apparatus of clause 73, wherein the controller having circuitry to cause the electron beam inspection apparatus to further perform:
determining a second scanning path including a second scan for obtaining the second image, the second scanning path based on an overall scan area for the plurality of training locations.

75. The electron beam inspection apparatus of clause 74, wherein the first scan includes a first number of scans, wherein the second scan includes a second number of scans, and wherein the second number of scans is larger than the first number of scans.

76. The electron beam inspection apparatus of any one of clauses 61 to 73, wherein the second image is obtained as a reference image by an optional user input.

77. The electron beam inspection apparatus of any one of clauses 61 to 76, wherein the controller having circuitry to cause the electron beam inspection apparatus to further perform:
using the machine learning model to modify a first image of a location to obtain a second image of the location, wherein the second image has an enhanced quality than the first image.

78. The electron beam inspection apparatus of any one of clauses 61 to 77, wherein identifying the plurality of training locations comprises identifying one or more training locations for each subset of patterns.

79. The electron beam inspection apparatus of any one of clauses 61 to 78, wherein the quality includes a resolution, a contrast, a brightness, or a noise level.

80. The electron beam inspection apparatus of any one of clauses 61 to 79, wherein the controller having circuitry to cause the electron beam inspection apparatus to further perform:
using the machine learning model to modify an image to approximate a result obtained with an increased number of scans.

81. The method of clause 1, wherein the patterns of data are scanning electron microscope (SEM) images of the product.

82. The method of clause 1, wherein the second image is obtained based on a plurality of low quality images.

83. The method of clause 1, wherein the second image is obtained by averaging the plurality of low quality images.

84. The method of clause 1, wherein the second image is obtained by combining the plurality of low quality images.
85. The method of clause 1, wherein the first image and the second image are images obtained by one or more scanning electron microscopes, and wherein the second image is a higher quality image than the first image.
86. The method of clause 85, wherein the second image has a higher resolution, higher contrast, higher brightness, or reduced noise level as compared to the first image.
87. The apparatus of clause 21, wherein the patterns of data are scanning electron microscope (SEM) images of the product.
88. The apparatus of clause 21, wherein the second image is obtained based on a plurality of low quality images.
89. The apparatus of clause 21, wherein the second image is obtained by averaging the plurality of low quality images.
90. The apparatus of clause 21, wherein the second image is obtained by combining the plurality of low quality images.
91. The non-transitory computer readable medium of clause 41, wherein the patterns of data are scanning electron microscope (SEM) images of the product.
92. The non-transitory computer readable medium of clause 41, wherein the second image is obtained based on a plurality of low quality images.
93. The non-transitory computer readable medium of clause 41, wherein the second image is obtained by averaging the plurality of low quality images.
94. The non-transitory computer readable medium of clause 41, wherein the second image is obtained by combining the plurality of low quality images.
95. The electron beam inspection apparatus of clause 61, wherein the patterns of data are scanning electron microscope (SEM) images of the product.
96. The electron beam inspection apparatus of clause 61, wherein the second image is obtained based on a plurality of low quality images.
97. The electron beam inspection apparatus of clause 61, wherein the second image is obtained by averaging the plurality of low quality images.
98. The electron beam inspection apparatus of clause 61, wherein the second image is obtained by combining the plurality of low quality images.

Example aspects or embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct a hardware processor core of a computer, other programmable data processing apparatus, or other devices to function in a particular manner, such that the instructions stored in the computer readable medium form an article of manufacture including instructions which implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart or block diagram block or blocks.

Any combination of one or more computer readable medium(s) may be utilized. The computer readable medium may be a non-transitory computer readable storage medium. A computer readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM, EEPROM or Flash memory), an optical fiber, a cloud storage, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, IR, etc., or any suitable combination of the foregoing.

Computer program code for carrying out operations for example embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the Figures illustrate examples of the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

Reference herein to "some aspects", "some embodiments" or "some exemplary embodiments" mean that a particular feature, structure, or characteristic described in connection with the embodiment can be included in at least one aspect, or one embodiment. The appearance of the phrases "one aspect", "some aspects", "one embodiment", "some embodiments" or "some exemplary embodiments" in various places in the specification do not all necessarily refer to the same embodiment, nor are separate or alternative embodiments necessarily mutually exclusive of other embodiments.

It should be understood that the steps of the example methods set forth herein are not necessarily required to be performed in the order described, and the order of the steps of such methods should be understood to be merely example. Likewise, additional steps may be included in such methods, and certain steps may be omitted or combined, in methods consistent with various embodiments.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word is intended to present concepts in a concrete fashion.

Additionally, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers or figure reference labels in the claims is intended to identify one or more possible embodiments of the claimed subject matter to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

It will be further understood that various changes in the details, materials, and arrangements of the parts which have been described and illustrated in order to explain the nature of described aspects or embodiments may be made by those skilled in the art without departing from the scope as expressed in the following claims.

The invention claimed is:

1. An apparatus for automatically obtaining training images to train a machine learning model that improves image quality, the apparatus comprising:
   a memory; and
   at least one processor coupled to the memory and configured to:
      analyze a plurality of patterns of data relating to a layout of a product to identify a plurality of training locations to use in relation to training the machine learning model;
      obtain a first scanning image having a first quality for each of the plurality of training locations;
      obtain a second scanning image having a second quality for each of the plurality of training locations, the second quality being higher than the first quality; and
      use the first scanning image and the second scanning image to train the machine learning model.

2. The apparatus of claim 1, wherein the data is in a database.

3. The apparatus of claim 2, wherein the database is any one of a graphic database system (GDS), an Open Artwork System Interchange Standard, or a Caltech Intermediate Form.

4. The apparatus of claim 3, where the GDS includes GDS formatted data or GDSII formatted data.

5. The apparatus of claim 1 wherein the at least one processor is further configured to obtain more than one first scanning image having a first quality for each of the plurality of training locations.

6. The apparatus of claim 1, wherein the at least one processor is further configured to obtain more than one second scanning image having a second quality for each of the plurality of training locations.

7. The apparatus of claim 1, wherein the at least one processor is further configured to classify the plurality of patterns into a plurality of subsets of patterns.

8. The apparatus of claim 1, wherein the at least one processor is further configured to extract a feature from the plurality of patterns.

9. The apparatus of claim 8, wherein the extracted feature includes a shape, a size, a density, or a neighborhood layout.

10. The apparatus of claim 7, wherein the at least one processor is further configured to classify the plurality of patterns into a plurality of subsets of patterns based on the extracted feature.

11. The apparatus of claim 7, wherein each subset of the plurality of subsets of patterns is associated with information relating to a location, a type, a shape, a size, a density or a neighborhood layout.

12. The apparatus of claim 1, wherein the at least one processor is further configured to identify the plurality of training locations based on a field of view, a local alignment point, or an auto-focus point.

13. The apparatus of claim 1, wherein the at least one processor is further configured to
   determine a first scanning path including a first scan for obtaining the first scanning image, the first scanning path based on an overall scan area for the plurality of training locations.

14. The apparatus of claim 13, wherein the at least one processor is further configured to
   determine a second scanning path including a second scan for obtaining the second scanning image, the second scanning path based on an overall scan area for the plurality of training locations.

15. A non-transitory computer readable medium storing a set of instructions that is executable by a controller of a device to cause the device to perform a method comprising:
- analyzing a plurality of patterns of data relating to a layout of a product to identify a plurality of training locations to use in relation to training the machine learning model;
- obtain a first scanning image having a first quality for each of the plurality of training locations;
- obtain a second scanning image having a second quality for each of the plurality of training locations, the second quality being higher than the first quality; and
- use the first scanning image and the second scanning image to train the machine learning model.

16. A method of automatically obtaining training images for use in training a machine learning model, the method comprising:
- analyzing a plurality of patterns of data relating to a layout of a product to identify a plurality of training locations to use in relation to training the machine learning model;
- obtaining a first scanning image having a first quality for each of the plurality of training locations;
- obtaining a second scanning image having a second quality for each of the plurality of training locations, the second quality being higher than the first quality; and
- using the first scanning image and the second scanning image to train the machine learning model.

* * * * *